US008954648B2

(12) United States Patent
Chen et al.

(10) Patent No.: US 8,954,648 B2
(45) Date of Patent: Feb. 10, 2015

(54) MEMORY DEVICE AND OPERATING METHOD THEREOF

(75) Inventors: Liang Chen, Beijing (CN); Chen Xiu, Beijing (CN)

(73) Assignee: Via Technologies, Inc., New Taipei (TW)

( * ) Notice: Subject to any disclaimer, the term of this patent is extended or adjusted under 35 U.S.C. 154(b) by 769 days.

(21) Appl. No.: 13/180,173

(22) Filed: Jul. 11, 2011

(65) Prior Publication Data

US 2012/0054419 A1 Mar. 1, 2012

(30) Foreign Application Priority Data

Aug. 27, 2010 (CN) .......................... 2010 1 0268915

(51) Int. Cl.
*G06F 12/00* (2006.01)
*G06F 12/02* (2006.01)
*G06F 11/14* (2006.01)

(52) U.S. Cl.
CPC ........ *G06F 12/0246* (2013.01); *G06F 11/1441* (2013.01); *G06F 2212/7201* (2013.01); *Y02B 60/1225* (2013.01)
USPC ........... 711/103; 711/100; 711/114; 711/117; 711/118; 711/161; 711/162; 711/205; 711/206; 711/207; 711/221

(58) Field of Classification Search
CPC ............ G06F 12/0223; G06F 12/0246; G06F 12/0846; G06F 12/0848; G06F 12/10; G06F 12/1009; G06F 2212/72; G06F 2212/7201; G06F 2212/7203
USPC ......... 711/103, 114, 117, 118, 161, 162, 205, 711/206, 207, 221
See application file for complete search history.

(56) References Cited

U.S. PATENT DOCUMENTS

| 6,219,752 | B1 * | 4/2001 | Sekido .......................... 711/114 |
| 6,711,663 | B2 * | 3/2004 | Lai et al. ....................... 711/206 |
| 2010/0030999 | A1 * | 2/2010 | Hinz ............................. 711/206 |
| 2010/0306447 | A1 * | 12/2010 | Lin et al. ....................... 711/103 |
| 2011/0029720 | A1 * | 2/2011 | Lu ................................. 711/103 |
| 2011/0225388 | A1 * | 9/2011 | Oh et al. ....................... 711/206 |

\* cited by examiner

*Primary Examiner* — Jared Rutz
*Assistant Examiner* — Zhuo H Li
(74) *Attorney, Agent, or Firm* — McClure, Qualey & Rodack, LLP (57) ABSTRACT

The invention provides a memory device. In one embodiment, the memory device comprises a flash memory, a memory, and a controller. The flash memory comprises a plurality of blocks for data storage. The memory stores an address mapping table recording relationships between logical addresses and physical addresses of the blocks therein. The controller divides the address mapping table stored in the memory to a plurality of mapping table units, updates relationships between the logical addresses and the physical addresses stored in the mapping table units, determines whether data access performed to the flash memory fulfills the conditions of a first specific requirement, and when the data access fulfills the conditions of the first requirement, the controller selects a target mapping table unit from the mapping table units, and stores the target mapping table unit and a corresponding time stamp as a mapping table unit data to the flash memory.

16 Claims, 7 Drawing Sheets

| Address mapping table | |
|---|---|
| Logical address | Physical address |
| $X_1$ | $Y_1$ |
| $X_2$ | $Y_2$ |
| $X_3$ | $Y_3$ |
| ⋮ | ⋮ |
| $X_Z$ | $Y_Z$ |

FIG. 1 ( PRIOR ART )

| Address mapping table | |
| --- | --- |
| Logical address | Physical address |
| $X_{A1}$ | $Y_{A1}$ |
| $X_{A2}$ | $Y_{A2}$ |
| ⋮ | ⋮ |
| $X_{An}$ | $Y_{An}$ |
| $X_{B1}$ | $Y_{B1}$ |
| $X_{B2}$ | $Y_{B2}$ |
| ⋮ | ⋮ |
| $X_{Bn}$ | $Y_{Bn}$ |
| ⋮ | ⋮ |
| $X_{K1}$ | $Y_{K1}$ |
| $X_{K2}$ | $Y_{K2}$ |
| ⋮ | ⋮ |
| $X_{Kn}$ | $Y_{Kn}$ |

MEMORY DEVICE AND OPERATING METHOD THEREOF

CROSS REFERENCE TO RELATED APPLICATIONS

This application claims priority of China Patent Application No. 201010268915.2, filed on Aug. 27, 2010, the entirety of which is incorporated by reference herein.

BACKGROUND OF THE INVENTION

1. Field of the Invention

The invention relates to flash memories, and more particularly to address mapping tables of flash memories.

2. Description of the Related Art

An ordinary flash memory device comprises a flash memory and a controller. The flash memory device stores data for a host. The controller operates as a communication interface between the host and the flash memory. When the host wants to write data to the flash memory, the controller receives write commands and writes data from the host, and then stores the write data to the flash memory according to the write commands. When the host wants to read data from the flash memory, the controller receives read commands from the host, and then reads data from the flash memory according to the read commands, and then sends the read-out data back to the host.

When the host wants to access the flash memory, the host indicates the target data with a logical address. The flash memory, however, stores data therein with physical addresses. When receiving a logical address of the target data to be accessed from the host, the controller must first convert the logical address to a physical address of the flash memory, and then access the corresponding physical address of the flash memory. The controller therefore must maintain an address mapping table for storing a mapping relationship between the logical addresses of the host and physical addresses of the flash memory as a reference for conversion between the logical addresses and physical addresses.

Figure 1:
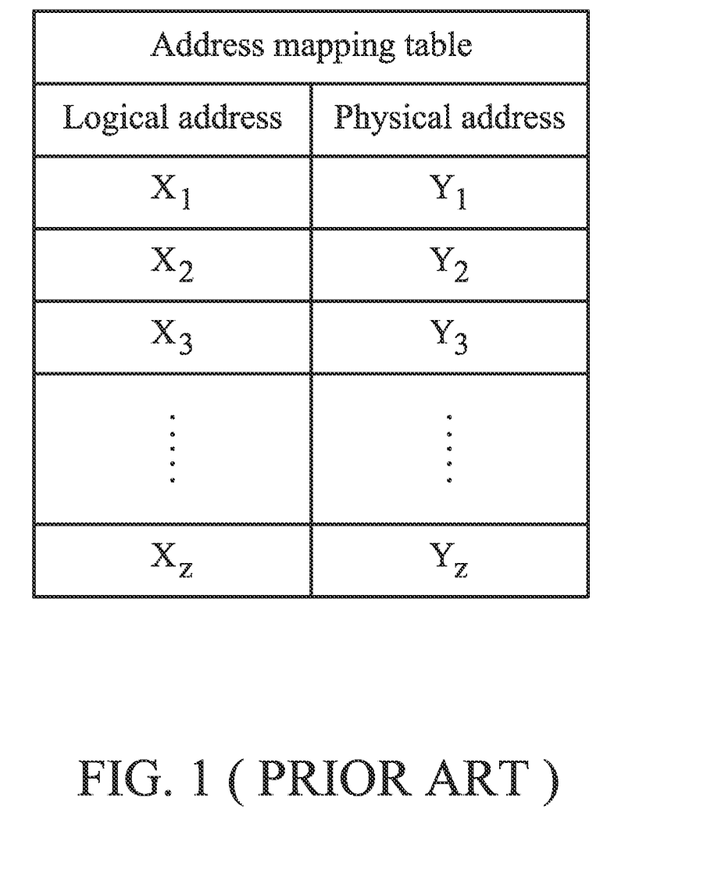
FIG. 1 is a schematic diagram of an address mapping table storing a mapping relationship from the logical addresses to the physical addresses.

Referring to FIG. 1, a schematic diagram of an address mapping table storing a mapping relationship from the logical addresses to the physical addresses is shown. According to the address mapping table, a logical address $X_1$ is mapped to a physical address $Y_1$, a logical address $X_2$ is mapped to a physical address $Y_2$, and a logical address $X_Z$ is mapped to a physical address $Y_Z$. Because the address mapping table records all mapping relationships of all physical addresses $Y_1 \sim Y_Z$ of the flash memory, the controller can therefore look up the corresponding physical address of the flash memory according to a logical address from the host.

Generally, the controller stores the address mapping table in a dynamic random access memory (DRAM) thereof. Because the DRAM can not hold data when a power of the DRAM is switched off, the controller must write the address mapping table stored in the DRAM to the flash memory before the power of a flash memory device is switched off. When the power of the flash memory device is switched on, the controller then loads the address mapping table from the flash memory to the DRAM as a reference for conversion between logical addresses and physical addresses.

However, when the power of the flash memory device is shut down accidentally, the controller cannot be able to write the whole address mapping table to the flash memory in time because the data amount of the address mapping table is too large. When the power of the flash memory device is switched on, the controller therefore cannot find the whole address mapping table from the flash memory to load to the DRAM. Therefore after the power of the flash memory device is shut down accidentally, the controller therefore cannot correctly perform conversion between logical addresses and physical addresses.

A conventional method for preventing the loss of the address mapping table is to backup each logical address in a free space of corresponding physical store unit (i.e., a physical page) addressed by the corresponding physical address in the flash memory. After the power of the flash memory device is suddenly switched off and then on, the controller can still scan the free space of all the physical store units of the whole flash memory to rebuild the whole address mapping table. The scanning, however, requires long execution time periods which is not permitted in the normal boot time of the device, and therefore degrades system performance. Another method for preventing the loss of the address mapping table is to have some capacitors disposed between the power supply and the controller. When the power supply is shut down accidentally, the controller can still write the address mapping table from the DRAM to the flash memory according to the power supplied by the capacitors. Having the capacitors, however, increases manufacturing cost and the physical size of the flash memory device. Thus, an operating method for a flash memory device is therefore required to store the address mapping table to the flash memory before the power of the flash memory device is switched off.

BRIEF SUMMARY OF THE INVENTION

The invention provides an operating method for a memory device. In one embodiment, the memory device comprises a controller, a memory, and a flash memory. First, an address mapping table stored in the memory is divided into a plurality of mapping table units. Relationships between logical addresses and physical addresses stored in the mapping table units are then updated. Whether data access performed by the controller to the flash memory fulfills the conditions of a first specific requirement is then determined. When the data access fulfills the conditions of the first requirement, a target mapping table unit is then selected from the mapping table units, and the target mapping table unit and a corresponding time stamp is then stored as a mapping table unit data to the flash memory.

The invention provides a memory device. In one embodiment, the memory device comprises a flash memory, a memory, and a controller. The flash memory comprises a plurality of blocks for data storage. The memory stores an address mapping table recording relationships between logical addresses and physical addresses of the blocks. The controller divides the address mapping table stored in the memory to a plurality of mapping table units, updates relationships between the logical addresses and the physical addresses stored in the mapping table units, determines whether data access performed on the flash memory fulfills the conditions of a first specific requirement, and when the data access fulfills the conditions of the first requirement, the controller selects a target mapping table unit from the mapping table units, and stores the target mapping table unit and a corresponding time stamp as a mapping table unit data to the flash memory.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2:
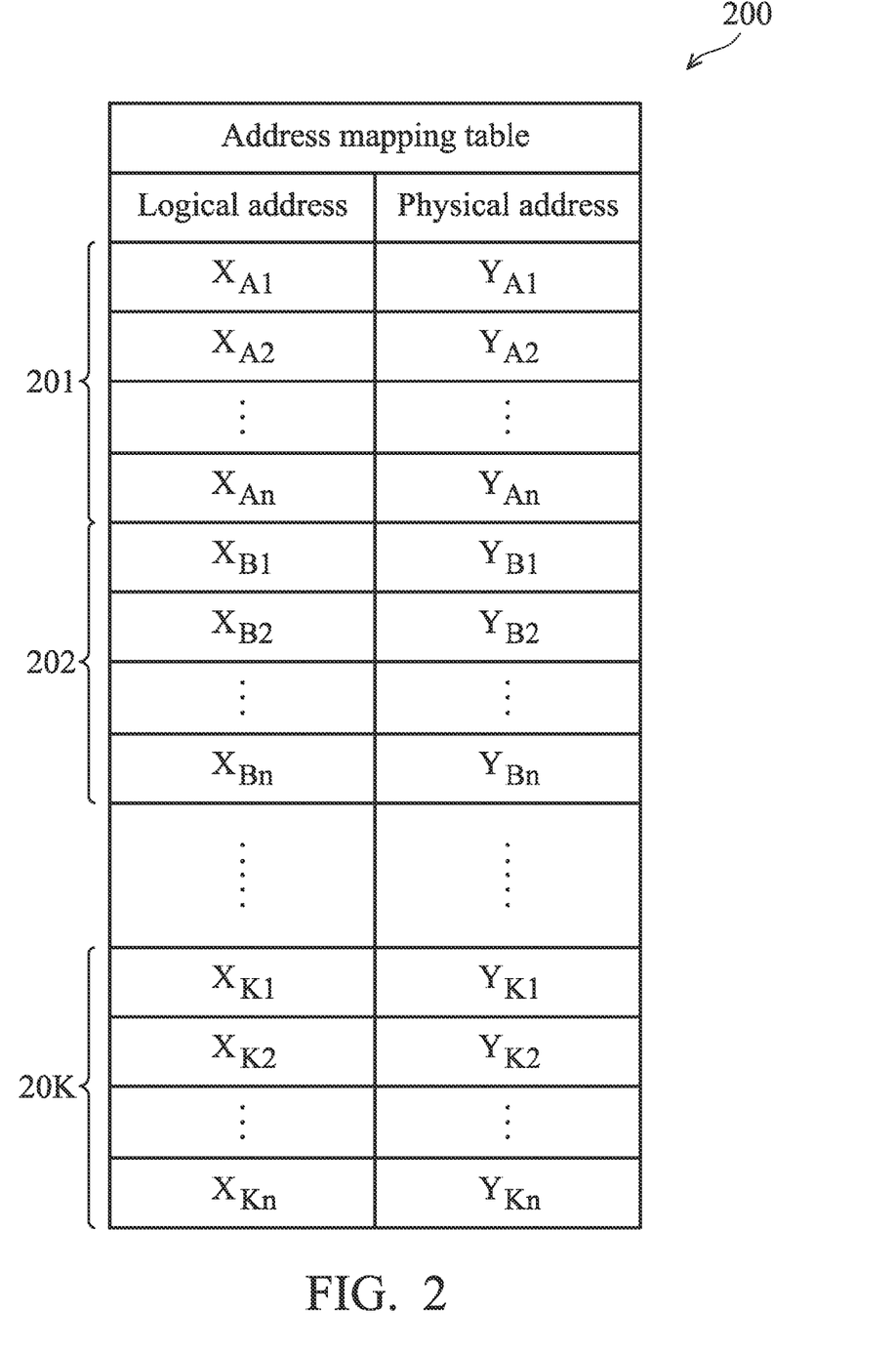
FIG. 2 is a schematic diagram of an address mapping table according to the invention.

Referring to FIG. 2, a schematic diagram of an address mapping table 200 according to the invention is shown. A controller of a flash memory device comprises a memory. In one embodiment, the memory is a dynamic random access memory (DRAM). The address mapping table 200 is divided into a plurality of mapping table units 201, 202, ..., 20K. The mapping table units 201~20K are stored in the memory of the controller. The mapping table units 201~20K respectively store a portion of mapping relationships from the logical addresses to physical addresses. In one embodiment, each of the mapping table units 201~20K stores a mapping relationship corresponding to a specific logical address range. For example, the mapping table unit 201 stores the mapping relationship corresponding to the logical address range $X_{A1} \sim X_{AN}$, and the mapping table unit 202 stores the mapping relationship corresponding to the logical address range $X_{B1} \sim X_{BN}$. In another embodiment, each of the mapping table units 201~20K stores a mapping relationship corresponding to a specific physical address range. For example, the mapping table unit 201 stores the mapping relationship corresponding to the physical address range $Y_{A1} \sim Y_{AN}$, and the mapping table unit 202 stores the mapping relationship corresponding to the physical address range $Y_{B1} \sim Y_{BN}$. The mapping table units 201~20K can be combined to obtain a complete address mapping table 200, and the controller can then convert a logical address to a physical address according to the address mapping table 200.

Figure 3:
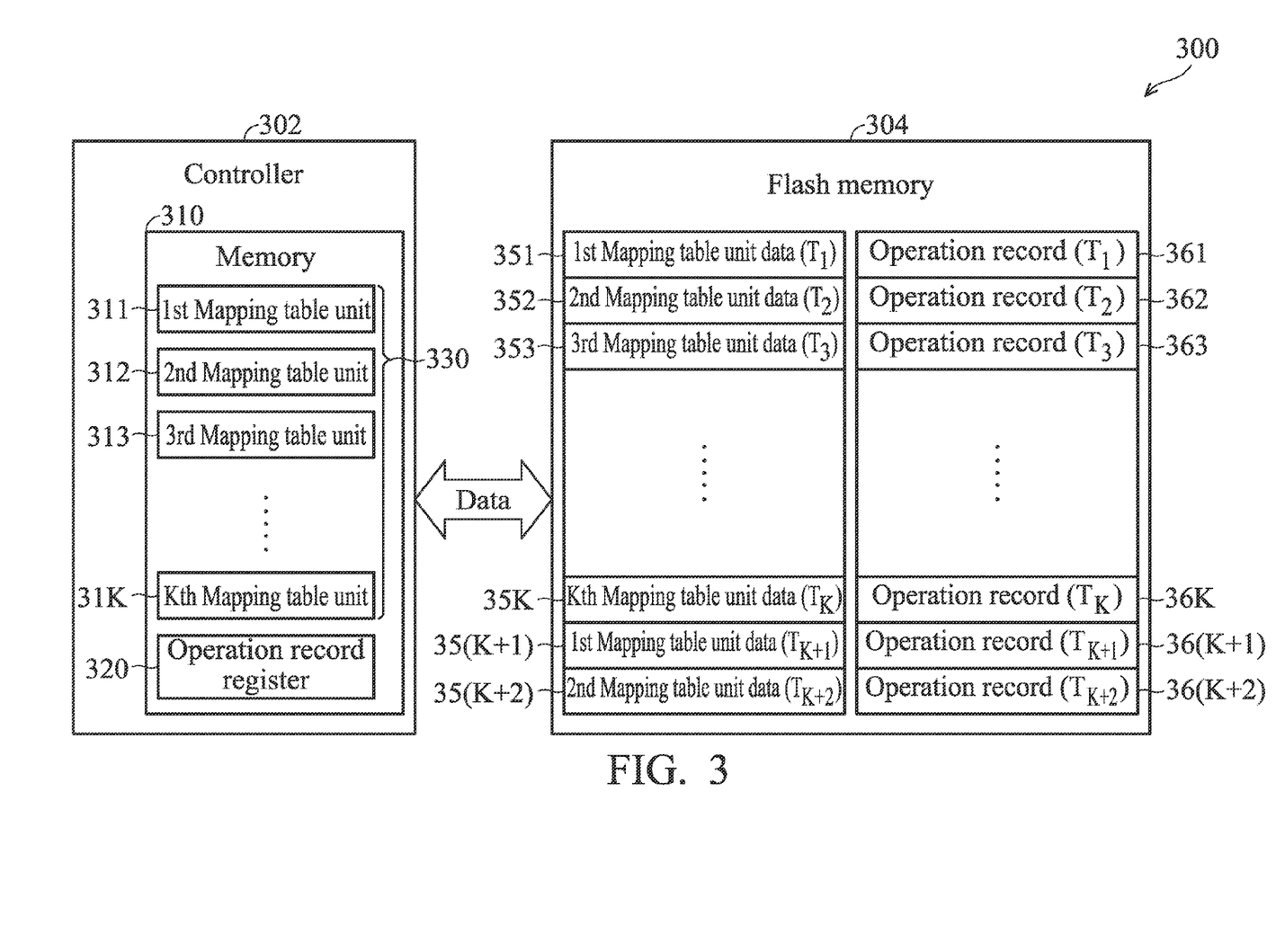
FIG. 3 is a block diagram of a flash memory device according to the invention.

Referring to FIG. 3, a block diagram of a flash memory device 300 according to the invention is shown. In one embodiment, the flash memory device 300 comprises a controller 302 and a flash memory 304. The controller 302 comprises a memory 310. In one embodiment, the memory 310 is a dynamic random access memory (DRAM). In another embodiment, the memory 310 is an independent component exterior to the controller 302. The memory 310 stores K mapping table units 311~31K which respectively store a portion of a mapping relationships between logical addresses and physical addresses. The mapping table units 311~31K are combined to form an address mapping table 330. The memory 310 further comprises an operation record register 320. The operation record register 320 stores records of data access operations performed by the controller 302 to the flash memory 304, wherein the data access operations change the mapping relationships between the logical addresses and physical addresses. In one embodiment, each of the mapping table units 311~31K occupies a page of the flash memory 304, and the operation record register 320 also occupies a page of the flash memory 304.

When the controller 302 performs data access to the flash memory 304, the controller 302 writes records of the data access operation to the operation record register 320 at a predetermined interval. Because the data access operation changes the mapping relationships between logical addresses and physical addresses, the controller 302 writes the changed portion of the mapping relationship as operation records to the operation record register 320, and also updates the mapping relationships in the corresponding mapping table units of the mapping table units 311~31K. In one embodiment, the mapping table units 311~31K are stored in a series of pages of the memory 310, wherein the logic page ID of the pages in the memory 310 are continuous. The controller 302 further monitors whether the data access operation performed to the flash memory 304 fulfills a specific requirement. In one embodiment, the specific requirement is when the controller 302 has accessed a predetermined data amount from the flash memory 304 or a predetermined time interval has passed. When the specific requirement is fulfilled, the controller 302 writes one of the mapping table units 311~31K and a corresponding time stamp as a mapping table unit data to the flash memory 304. In addition, when the specific requirement is fulfilled, the controller 302 writes the operation record stored in the operation record register 320 and the corresponding time stamp as an operation record data to the flash memory 304. In one embodiment, each mapping table data and each operation record data respectively occupies storage space of one page of the flash memory 304, and the address of the page storing the mapping table data is differed from the address of the page storing the operation record data by a predetermined difference value. In another embodiment, the controller 302 writes the mapping table data to the flash memory 304 with a different frequency from that in which the operation record is written to the flash memory 304.

For example, when the specific requirement is fulfilled at time $T_1$, the controller 302 first writes the first mapping table unit 311 and the time stamp $T_1$ as the mapping table unit data 351 to the flash memory 304, and then writes the operation record stored in the operation record register 320 and the corresponding time stamp $T_1$ as the operation record data 361 to the flash memory 304. When the specific requirement is fulfilled again at time $T_2$, the controller 302 writes the second mapping table unit 312 and the time stamp $T_2$ as the mapping table unit data 352 to the flash memory 304, and then writes the operation record stored in the operation record register 320 and the corresponding time stamp $T_2$ as the operation record data 362 to the flash memory 304. When the specific requirement is fulfilled again at time $T_3$, the controller 302 writes the third mapping table unit 313 and the time stamp $T_3$ as the mapping table unit data 353 to the flash memory 304, and then writes the operation record stored in the operation record register 320 and the corresponding time stamp $T_3$ as the operation record data 363 to the flash memory 304. The aforementioned process is continued. When the specific requirement is fulfilled at time $T_K$, the controller 302 writes the N-th mapping table unit 31K and the time stamp $T_K$ as the mapping table unit data 35K to the flash memory 304, and then writes the operation record stored in the operation record register 320 and the corresponding time stamp $T_K$ as the operation record data 36K to the flash memory 304. Thus, all mapping table units 311~31K are written to the flash memory 304 to become the mapping table unit data 351~35K.

When the specific requirement is fulfilled at time $T_{K+1}$, the controller 302 again writes the first mapping table unit 311 and the time stamp $T_{K+1}$ as the mapping table unit data 35(K+1) to the flash memory 304, and then writes the operation record stored in the operation record register 320 and the corresponding time stamp $T_{K+1}$ as the operation record data 36(K+1) to the flash memory 304. Because the mapping table unit data 351 and 35(K+1) stored in the flash memory 304 both correspond to the first mapping table unit 311, and the mapping table unit data 35(K+1) has a later time stamp $T_{K+1}$ than the time stamp $T_1$ of the mapping table unit data 351, the mapping table unit data 35(K+1) contains an updated first mapping table unit 311, and the mapping table unit data 351 is therefore replaced by the mapping table unit data 35(K+1). The replaced mapping table unit data 351 is therefore marked as invalid data. In one embodiment, the mapping table unit data 351~35K are sequentially stored in the flash memory 304 according to the order of the logic page IDs of the corresponding mapping table units 311~31K in the memory 310. When the mapping table unit data 35(K+1) is stored in the flash memory 304, if it is determined that the logic page ID of the mapping table unit data 35(K+1) is the same as that of the mapping table unit data 35K, and the time stamp $T_{K+1}$ of the mapping table unit data 35(K+1) is later than that of the mapping table unit data 351. The old-version mapping table unit data 351 is therefore marked as invalid data. The mapping table unit data 352~35(K+1) can therefore be combined together to form a complete copy of an address mapping table. In addition, because the mapping table unit data 351 has been marked as invalid data, the operation record data 361 having the same time stamp $T_1$ as that of the invalid mapping table unit data 351 is therefore also marked as invalid data.

Figure 4:
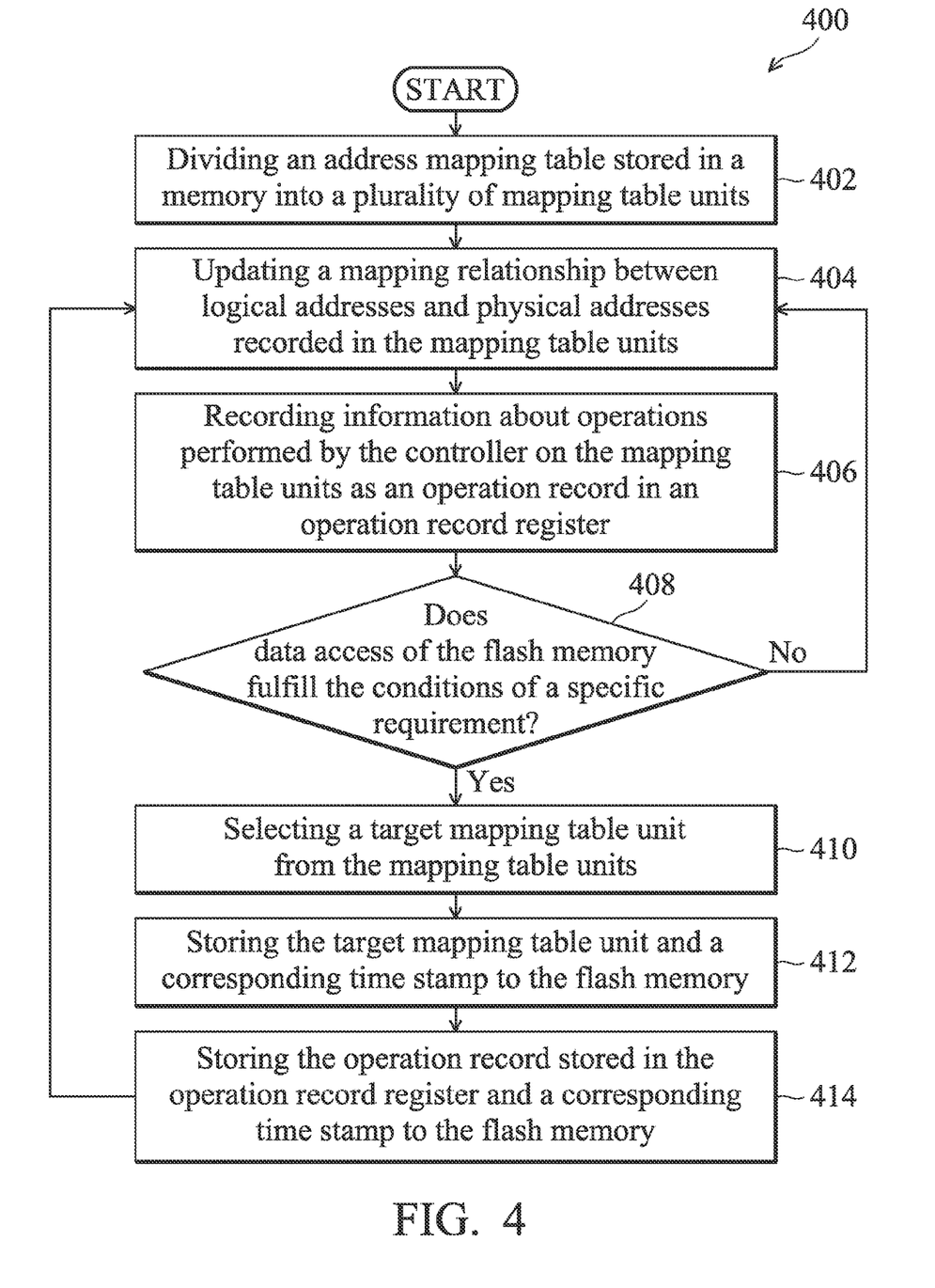
FIG. 4 is a flowchart of a method for writing mapping table units to the flash memory according to the invention.

Referring to FIG. 4, a flowchart of a method 400 for writing mapping table units to the flash memory 304 according to the invention is shown. First, the controller 302 divides the address mapping table 330 stored in the memory 310 to a plurality of mapping table units 311~31K (step 402). The controller 302 then updates a mapping relationship between logical addresses and physical addresses stored in the mapping table units 311~31K (step 404). The controller 302 then records information about data access operations performed to the mapping table units 311~31K as operation record in an operation record register 320 of the memory 310 (step 406), wherein the data access operations induce change of the mapping relationship between the logical addresses and physical addresses of physical pages of the flash memory 304. The controller 302 then determines whether data accesses of the flash memory 304 fulfills the conditions of a specific requirement (step 408). Whenever a block of the flash memory 304 is filled with data written by the controller 302, the controller 302 allocate a free block for subsequent data storage from the free block area of the flash memory 304. Thus, when the controller 302 obtains a free block from the free block area of the flash memory 304, the amount of data written to the flash memory 304 reaches a predetermined level of one data block. Therefore, the specific requirement of step 408, in one embodiment, is when the controller 302 obtains a free block for data storage from a free block area of the flash memory 304. In another embodiment, the specific requirement of step 408 is when a predetermined time interval has passed, that is, a difference value between a time stamp corresponding to the data access of step 408 and a prior time stamp stored to the flash memory 304 is greater than a threshold. The time interval is determined by the frequency in which the mapping table units 311~31K are written to the flash memory 304, wherein the frequency is further determined according to a system boot up time period and write bandwidth consumption. The higher the frequency is, the more the write bandwidth consumption is, but meanwhile the data amount of every operation record is less for shorter time interval. Thus, the time consume to rebuild the address mapping table is less to speed up the boot of the system. The frequency could be determined by the designer of the system based on the requirement of the system performance.

When the specific requirement is fulfilled at step 408, the controller 302 selects a target mapping table unit from the mapping table units 311~31K (step 410), and then writes the target mapping table unit and a corresponding time stamp to the flash memory 304 (step 412). In one embodiment, the memory 310 comprises a plurality of logical page pairs respectively for storage of the mapping table units 311~31K. When a target mapping table unit stored in a page of a page pair of the memory 310 is written to the flash memory 304, the other page of the page pair can still receive updated data of the target mapping table unit, thereby resulting in a ping-pong buffering operation to avoid that the old target mapping table unit is covered by the updated data. In addition, when the specific requirement is fulfilled at step 408, the controller 302 writes the operation record stored in the operation record register 320 and a corresponding time stamp to the flash memory 304 (step 414). In one embodiment, the operation record register 320 also has at least one logical page pair for data storage. When old operation record stored in a page of the operation record register 320 is written to the flash memory 304, another page of the operation record register 320 can still receive new data of operation record, thereby resulting in a ping-pong buffering operation to avoid that the old operation record is covered by the new data of operation record. Because when the data access fulfills the conditions of the specific requirement at step 408, only one of the K mapping table units 311~31K is written to the flash memory 304, thus, there is only little delay on the data access of the flash memory 304, and minimal degrading of performance, like write bandwidth consumption is induced.

Figure 5:
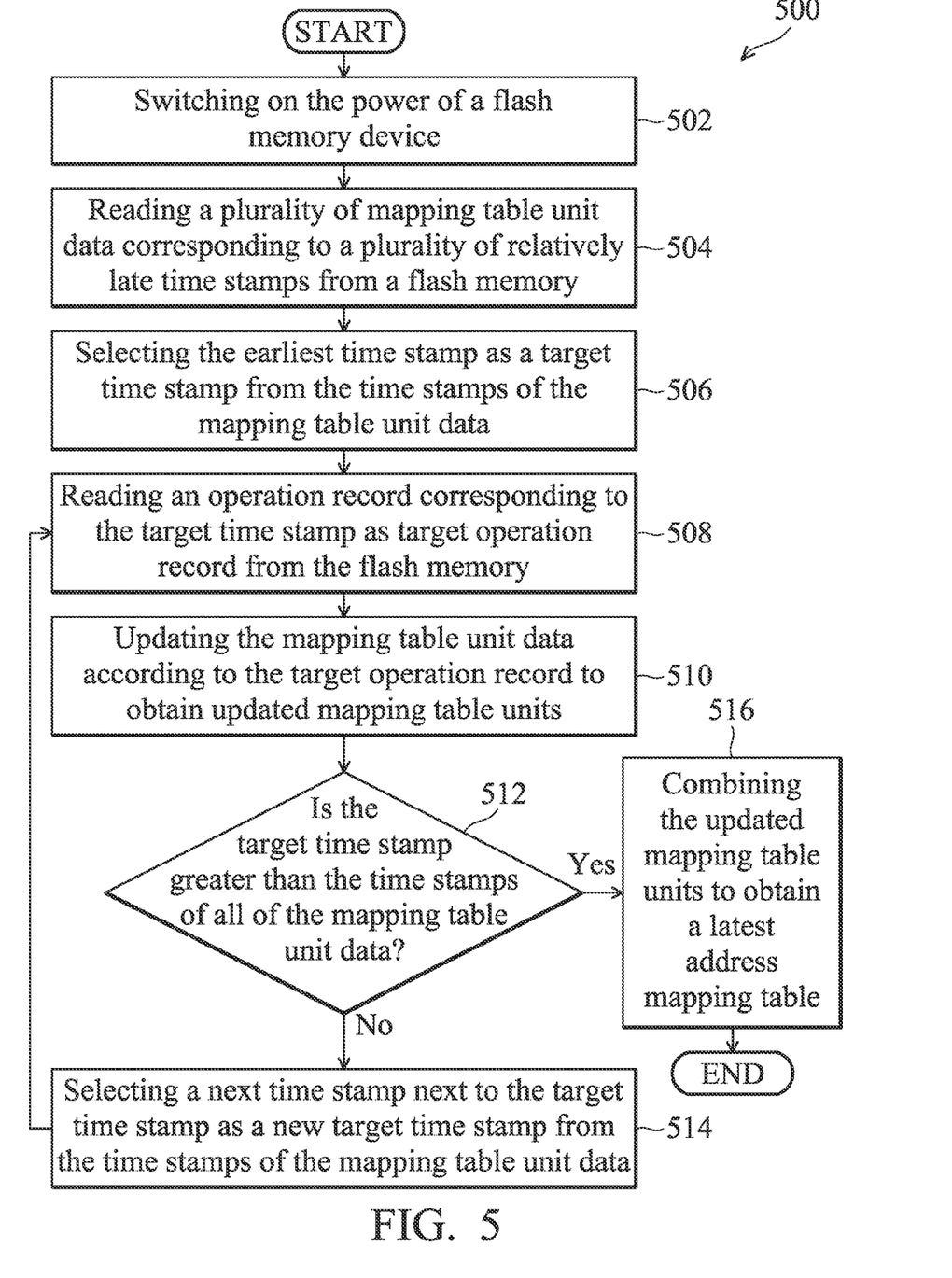
FIG. 5 is a flowchart of a method for rebuilding a latest address mapping table according to mapping table unit data stored in the flash memory according to the invention.

Referring to FIG. 5, a flowchart of a method 500 for rebuilding a latest address mapping table according to mapping table unit data stored in the flash memory 304 according to the invention. Assume that the power of the flash memory device 300 is suddenly switched off and then switched on again (step 502). The controller 302 then reads a plurality of mapping table unit data corresponding to a plurality of relatively latest time stamps from the flash memory 304 (step 504). In one embodiment, there is a plurality of mapping table unit data corresponding to the same mapping table unit, but with different time stamps stored in the flash memory 304, and the controller 302 compares the time stamps of the mapping table unit data to obtain a relatively latest time stamp and reads out the mapping table unit data corresponding to the relatively latest time stamp from the flash memory 304. For example, as shown in FIG. 3, both the data 351 and the data 35(K+1) are data of the first mapping table unit 311. Because the mapping table unit data 35(K+1) has a time stamp $T_{K+1}$ later than the time stamp $T_1$ of the mapping table unit data 351, the controller 302 reads the mapping table unit data 35(K+1) from the flash memory 304 rather than the mapping table unit data 351. In addition, both the data 352 and the data 35(K+2) shown in FIG. 3 are data of the second mapping table unit 312. Because the mapping table unit data 35(K+2) has a time stamp $T_{K+2}$ later than the time stamp $T_2$ of the mapping table unit data 352, the controller 302 reads the mapping table unit data 35(K+2) from the flash memory 304 rather than the mapping table unit data 352. The controller 302 therefore finally reads out K mapping table unit data, that is, the mapping table unit data 353~35(K+2) from the flash memory 304. In another embodiment, the mapping table unit data 351~35(K+2) are sequentially stored in the pages of the flash memory 304 according to the sequence of the logic page IDs in the memory 310. The controller 302 therefore only needs to determine the absolutely latest time stamps from the time stamps of the mapping table unit data, and then reads out the mapping table unit data corresponding to the absolutely latest time stamp and (K−1) mapping table unit data respectively corresponding to the (K−1) time stamps prior to the absolutely latest time stamp from the flash memory 304. For example, as shown in FIG. 3, the absolutely latest time stamp is $T_{K+2}$, and the controller 302 therefore reads the mapping table unit data 35(K+2) corresponding to the time stamp $T_{K+2}$ from the flash memory 304. In addition, the controller 302 also reads out the (K−1) mapping table unit data 353~35(K+1) prior to the mapping table unit data 35(K+2) respectively corresponding to the time stamps $T_3$~$T_{K+1}$ from the flash memory 304. The read-out mapping table unit data 353~35(K+2) are therefore the latest mapping table unit data, which could be then used to rebuild the latest address mapping table before the power is switched off.

The controller 302 then selects the earliest time stamp from the time stamps of the mapping table unit data 353~35(K+2) as a target time stamp (step 506). For example, the mapping table unit data 353~35(K+2) have corresponding time stamps $T_3$~$T_{K+2}$, and the controller 302 selects the earliest time stamp $T_3$ as the target time stamp. The controller 302 then reads operation record 363 corresponding to the target time stamp $T_3$ as target operation record from the flash memory 304 (step 508). The controller 302 then updates the mapping table unit data 353~35(K+2) according to the target operation record 363 to obtain updated mapping table units (step 510). Specifically, at the step 510, the controller 302 compares the time stamps of the mapping table unit data 353~35(K+2). If the time stamps of the mapping table unit data 353~35(K+2) are earlier than the target time stamp $T_3$ of the target operation record 363, the controller 302 updates the mapping table unit data 353~35(K+2) according to the target operation record 363. For example, because the time stamps of the mapping table unit data 353~35(K+2) are all later than or equal to the target time stamp $T_3$ of the target operation record 363, the controller 302 therefore does not update any one of the mapping table unit data 353~35(K+2) according to the target operation record 363. The controller 302 then selects a next time stamp $T_4$ subsequent to the target time stamp $T_3$ as a new target time stamp from the time stamps of the mapping table unit data 353~35(K+2) (step 514), reads operation record 364 corresponding to the new target time $T_4$ stamp as target operation record from the flash memory 304 (step 508), and updates the mapping table unit data 353~35(K+2) according to the target operation record 364 to obtain updated mapping table units (step 510). Because among all the mapping table unit data 353~35(K+2), only the time stamp $T_3$ of the mapping table unit data 353 is earlier than the target time stamp $T_4$ of the target operation record 364, the controller 302 therefore only updates the mapping table unit data 353 according to the target operation record 364. The loop of steps 508~514 is repeatedly executed until the target time stamp is later than the time stamps of all of the mapping table unit data 353~35(K+2) (step 512). Finally, the controller 302 combines the updated mapping table units to obtain a latest address mapping table (step 516).

Figure 6:
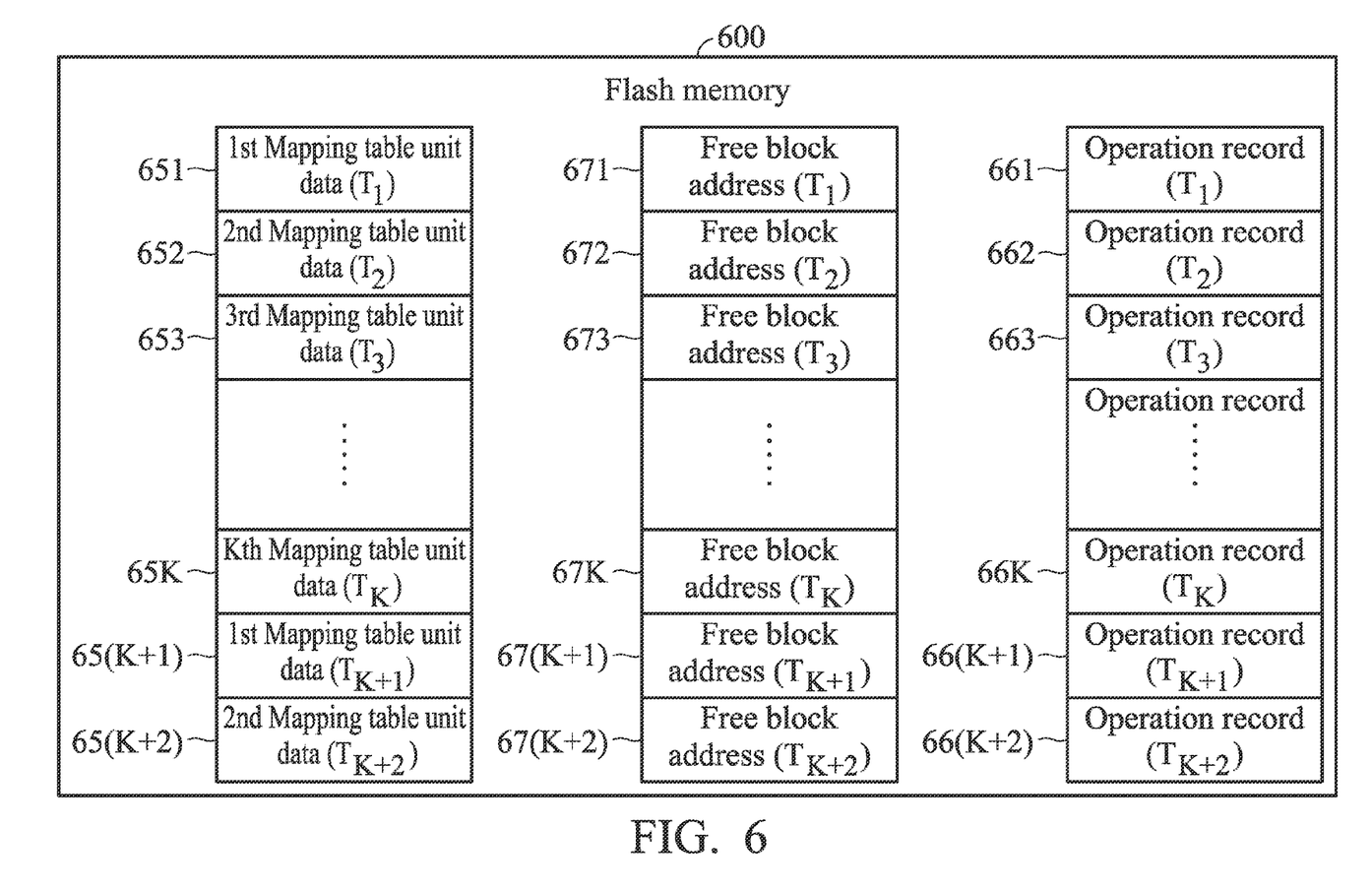
FIG. 6 is a schematic diagram of an embodiment of data stored in a flash memory according to the invention.

Referring to FIG. 6, a schematic diagram of an embodiment of data stored in a flash memory 600 according to the invention is shown. The flash memory device 300 shown in FIG. 3 stores two kinds of data, which include the mapping table unit data 351~35(K+2) and the operation record 361~36(K+2). In FIG. 6, the flash memory 600 stores three kinds of data, which include the mapping table unit data 651~65(K+2), the operation records 661~66(K+2), and the addresses 671~67(K+2) of free blocks recently allocated by the controller from the flash memory 600. According to an embodiment of FIG. 4, whenever the controller 302 allocates a free block from a free block area of a flash memory, the controller 302 writes a mapping table unit and operation record to the flash memory 600. In addition, the controller 302 further writes the address of the free block and a corresponding time stamp to the flash memory 600. Thus, when the power of the flash memory device is switched off and then switched on again, the controller 302 rebuilds a latest address mapping table according to the method 500 shown in FIG. 5. When the loop of steps 508~514 is executed, at last, the controller 302 selects the absolutely latest time stamp $T_{K+2}$ as the target time stamp (step 514), then the controller 302 will execute step 508 to read the operation record 66(K+2) corresponding to the time stamp $T_{K+2}$. But it may occasionally happen that the operation record 66(K+2) is not properly stored in the flash memory 600 because the power may be switched off at anytime, and if the power is switched off exactly when the operation record 66(K+2) is written to the flash memory 600, the operation record 66(K+2) is damaged. The controller 302 then cannot read out the operation record 66(K+2), but can read the physical address 67(K+2) of the free block corresponding to the latest time stamp $T_{K+2}$ from the flash memory 600, and then scan the free block corresponding to the physical address 67(K+2) to rebuild operation record 66(K+2) corresponding to the latest time stamp $T_{K+}2$ using a mapping relationship between the physical addresses and logical addresses stored in spare area of the free block, cause between the time stamp $T_{K+2}$ and $T_{K+2}$, the access operation executed by the controller 302 to the flash memory 600 is only limited in the latest allocated free block. In one embodiment, each of the mapping table unit data 651~65(K+2) and the corresponding free block addresses 671~67(K+2) are respectively stored in a page of the flash memory 600. Each operation record 661~66(K+2) is respectively stored in another page of the flash memory 600. In another embodiment, the mapping table unit data 651~65(K+2), the free block addresses 671~67(K+2), and the operation record 661~66(K+2) are stored in a plurality of blocks corresponding to a specific logical address range of the flash memory 600, wherein these blocks could be replaced by blocks with less erase count based on the consideration of wear-leveling to prevent abusing these blocks.

Figure 7:
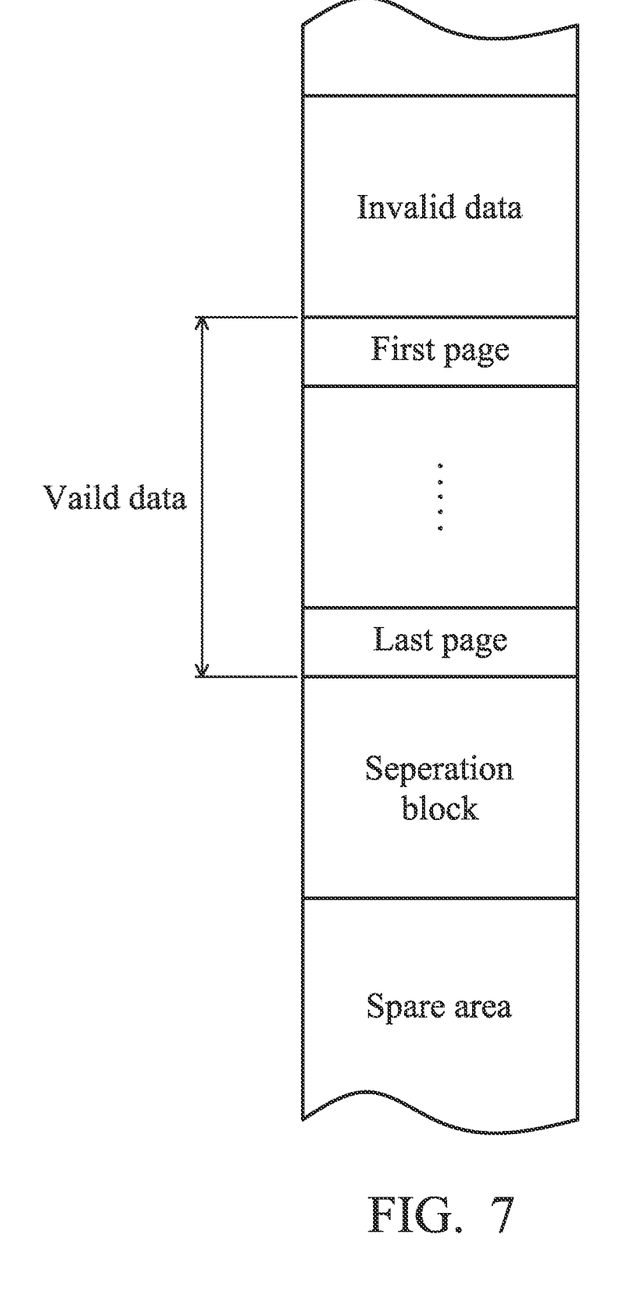
FIG. 7 is a schematic diagram of a segment of a flash memory storing mapping table unit data and operation record according to the invention.

Referring to FIG. 7, a schematic diagram of a segment of a flash memory 304 storing mapping table unit data according to the invention is shown. As described in one embodiment of FIG. 3, after the controller 302 continues to write more and more data of mapping table unit data to the flash memory 304, the mapping table unit data corresponding to old time stamps are marked as invalid data, and only the mapping table unit data corresponding to the relatively latest time stamps are marked as valid data for rebuilding a latest address mapping table according to the method 500 shown in FIG. 5. A separation block positioned between the valid data and a free block area of the flash memory is taken as a delimiter to separate the valid data area storing the mapping table unit data from the free block area containing free blocks. In one embodiment, the separation block stores a specific data pattern. In another embodiment, the separation block could be a free block. When the power of the flash memory device 300 is switched on, the controller 302 can rapidly find the latest page storing the valid data from the flash memory 304 according to the separation block. In one embodiment, when a latest valid page storing the mapping table unit data corresponding to the absolutely latest time stamp is found (as one embodiment of the step 504), the controller 302 subtracts K pages from the address of the latest valid page to obtain an address of a first valid page, and then reads K valid mapping table unit data from the pages within the address range between the first valid page and the latest valid page. The controller 302 then uses the data of the valid mapping table unit data to rebuild the latest address mapping table. Besides, the physical addresses of the segment of a flash memory 304 for storing operation records are differed from the physical addresses of the segment for storing the mapping table unit data by a predetermined difference value.

The flash memory device described in the invention stores (or snapshots) the mapping table units and operation records from the memory of the controller to the flash memory, which could be used to rebuild the address mapping table whenever the power is switched off. Besides, every snapshot only stores the data of one mapping table unit to the flash memory, which greatly reduces the write bandwidth consume to the flash memory and makes no delay to the access command from the host, and reduces the system boot up time due to limited data amount to handle when rebuilding the address mapping table. Moreover, the old mapping table unit data and the old operation records corresponding to the old time stamps are marked as invalid data, whose blocks could be erased to do garbage collection to make new free blocks. So the flash memory device and operating method described in the invention only occupies limited storage space in the flash memory.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An operating method for a memory device, wherein the memory device comprises a controller, a memory, and a flash memory, comprising:
    dividing an address mapping table stored in the memory to a plurality of mapping table units based on logical addresses;
    updating relationships between the logical addresses and physical addresses stored in the mapping table units;
    determining whether data access performed by the controller to the flash memory fulfills the conditions of a first specific requirement;
    when the data access fulfills the conditions of the first requirement, selecting a target mapping table unit from the mapping table units, and storing the target mapping table unit and a corresponding time stamp as a mapping table unit data to the flash memory;
    recording information about an operation performed by the controller on the address mapping table as an operation record in an operation record register of the memory;
    when the data access performed by the controller to the flash memory fulfills the conditions of a second requirement, storing the operation record and a corresponding time stamp to the flash memory;
    when the power of the memory device is switched on, reading a plurality of latest mapping table unit data corresponding to a plurality of relatively latest time stamps from the flash memory;
    reading a plurality of latest operation records corresponding to the plurality of relatively latest time stamps from the flash memory;
    updating the plurality of latest mapping table unit data according to the plurality of latest operation records to obtain a plurality of updated mapping table units;
    combining the updated mapping table units together to obtain an updated address mapping table;
    when the power of the memory device is switched on, and an absolutely latest operation record corresponding to an absolutely latest time stamp cannot be read out from the flash memory, reading a physical address of a target free block corresponding to the absolutely latest time stamp from the flash memory, wherein the absolutely latest time stamp is the latest one among the plurality of relatively latest time stamps;
    reading a mapping relationship between the physical addresses and logical addresses from the target free block; and
    rebuilding the absolutely latest operation record according to the mapping relationship between the physical addresses and logical addresses read from the target free block.

2. The operating method as claimed in claim 1, wherein the first specific requirement and the second requirement means that the controller has allocated a free block for data storage from a free block area of the flash memory.

3. The operating method as claimed in claim 2, wherein the operating method further comprises:
    when the target mapping table unit and the corresponding time stamp are stored to the flash memory, storing a physical address of the free block and the corresponding time stamp to the flash memory.

4. The operating method as claimed in claim 1, wherein the first requirement and the second requirement means that the difference value between the time stamp corresponding to the data access and a prior time stamp stored to the flash memory is greater than a threshold.

5. The operating method as claimed in claim 1, wherein the mapping table unit data is stored in a first page of the flash memory, the operation record corresponding to the same time stamp as that of the mapping table unit data is stored in a second page of the flash memory, and the difference value between the addresses of the first page and the second page is equal to a fixed value.

6. The operating method as claimed in claim 1, wherein updating of the plurality of latest mapping table unit data comprises:
    selecting a target time stamp from the plurality of relatively latest time stamps;
    respectively comparing the plurality of relatively latest time stamps with the target time stamp;
    when the target time stamp is later than one of the plurality of relatively latest time stamps, updating one of the plurality of the latest mapping table unit data corresponding to the one of the plurality of relatively latest time stamps according to one of the plurality of the latest operation records corresponding to the target time stamp; and
    selecting a new target time stamp from the plurality of relatively latest time stamps and repeating the comparing step and the updating step.

7. The operating method as claimed in claim 1, wherein the physical address of the target free block corresponding to the absolutely latest time stamp is stored to the flash memory when the mapping table unit data corresponding to the absolutely latest time stamp is stored to the flash memory.

8. The operating method as claimed in claim 1, wherein the operating method further comprises:
comparing time stamps of mapping table unit data stored in the flash memory; and
when a first mapping table unit data and a second mapping table unit data correspond to the same mapping table unit, and the first mapping table unit data has an earlier time stamp than that of the second mapping table unit data, marking the first mapping table unit data as invalid data.

9. A memory device, comprising:
a flash memory, comprising a plurality of blocks for data storage;
a memory, storing an address mapping table recording relationships between logical addresses and physical addresses of the blocks; and
a controller, dividing the address mapping table stored in the memory to a plurality of mapping table units based on the logical addresses, updating relationships between the logical addresses and the physical addresses stored in the mapping table units, determining whether data access performed to the flash memory fulfills the conditions of a first specific requirement, and when the data access fulfills the conditions of the first requirement, selecting a target mapping table unit from the mapping table units, and storing the target mapping table unit and a corresponding time stamp as a mapping table unit data to the flash memory;
wherein the controller records information about an operation performed on the address mapping table as an operation record in an operation record register of the memory, and when the data access performed to the flash memory fulfills the conditions of a second requirement, the controller stores the operation record and a corresponding time stamp to the flash memory;
wherein when the power of the memory device is switched on, the controller reads a plurality of the latest mapping table unit data corresponding to a plurality of relatively latest time stamps from the flash memory, reads a plurality of latest operation records corresponding to the plurality of relatively latest time stamps from the flash memory, updates the plurality of latest mapping table unit data according to the plurality of latest operation records to obtain a plurality of updated mapping table units, and combines the updated mapping table units to obtain an updated address mapping table; and
wherein when the power of the memory device is switched on, and the controller cannot read out an absolutely latest operation record corresponding to an absolutely latest time stamp, the controller reads a physical address of a target free block corresponding to the absolutely latest time stamp from the flash memory, wherein the absolutely latest time stamp is the latest one among the plurality of relatively latest time stamps, the controller reads a mapping relationship between the physical addresses and logical addresses from the target free block, and rebuilds the absolutely latest operation record according to the mapping relationship between the physical addresses and logical addresses read from the target free block.

10. The memory device as claimed in claim 9, wherein the first specific requirement and the second requirement means that the controller has allocated a free block for data storage from a free block area of the flash memory.

11. The memory device as claimed in claim 10, wherein when the target mapping table unit and the corresponding time stamp are stored to the flash memory, the controller also stores a physical address of the free block and the corresponding time stamp to the flash memory.

12. The memory device as claimed in claim 9, wherein the first requirement and the second requirement means that the difference value between the time stamp corresponding to the data access and a prior time stamp stored to the flash memory is greater than a threshold.

13. The memory device as claimed in claim 9, wherein the mapping table unit data is stored in a first page of the flash memory, the operation record corresponding to the same time stamp as that of the mapping table unit data is stored in a second page of the flash memory, and the difference value between the addresses of the first page and the second page is equal to a fixed value.

14. The memory device as claimed in claim 9, wherein when the controller updates the plurality of latest mapping table unit data, the controller selects a target time stamp from the plurality of relatively latest time stamps, respectively compares the plurality of relatively latest time stamps with the target time stamp, updates one of the plurality of the latest mapping table unit data corresponding to one of the plurality of relatively latest time stamps according to one of the plurality of the latest operation records corresponding to the target time stamp if the target time stamp is later than the one of the plurality of relatively latest time stamps, and selects a new target time stamp from the plurality of relatively latest time stamps and repeats comparison of the plurality of relatively latest time stamps with the new target time stamp and updating of the plurality of relatively latest mapping table unit data.

15. The memory device as claimed in claim 9, wherein the physical address of the target free block corresponding to the absolutely latest time stamp is stored to the flash memory when the mapping table unit data corresponding to the absolutely latest time stamp is stored to the flash memory.

16. The memory device as claimed in claim 9, wherein the operation record register of the memory comprises at least two logic pages, and when the operation record stored in one logic page of the operation record register is stored to the flash memory, the controller writes new operation record to another logic page of the operation record register.

* * * * *

UNITED STATES PATENT AND TRADEMARK OFFICE
CERTIFICATE OF CORRECTION

PATENT NO. : 8,954,648 B2  
APPLICATION NO. : 13/180173  
DATED : February 10, 2015  
INVENTOR(S) : Chen et al.

Page 1 of 1

It is certified that error appears in the above-identified patent and that said Letters Patent is hereby corrected as shown below:

In The Specification

In column 8, line 35, please delete "the time stamp TK+2 and TK+2, the access operation executed" and substitute therefor: --the time stamp TK+1 and TK+2, the access operation executed--

Signed and Sealed this  
Nineteenth Day of July, 2016

Michelle K. Lee  
*Director of the United States Patent and Trademark Office*